3,041,273
PROCESS FOR THE CONVERSION OF HYDROCARBONS WITH THE USE OF AN EXPANDING TRANSFER LINE REACTOR
Kenneth A. Smith, Homewood, Ill., and William J. Tomsic, Brea, Calif., assignors, by mesne assignments, to Sinclair Research, Inc., New York, N.Y., a corporation of Delaware
Filed Sept. 9, 1953, Ser. No. 379,162
3 Claims. (Cl. 208—153)

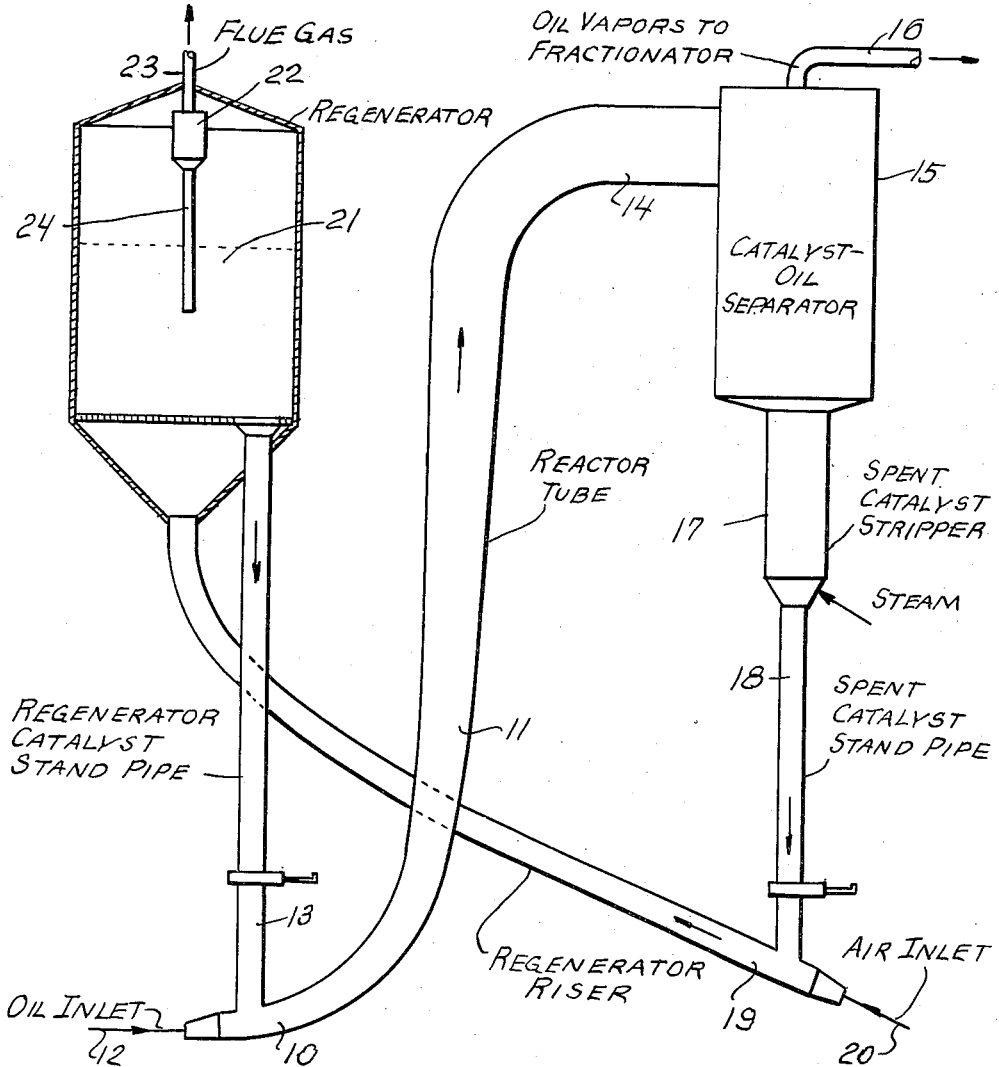

Our invention relates to improvements in processing procedure in the conversion of petroleum hydrocarbons at elevated temperature in the presence of a finely divided solid catalyst.

Conventional methods for contacting hydrocarbon charge stocks with finely divided solid catalysts in conversion processes have subordinated considerations of optimum contact procedure from the standpoint of chemical kinetics to procedure providing optimum practicality in terms of process continuity, flexibility and simplicity. Thus the fluidized bed reaction system for catalytic cracking has been adopted commercially on a large scale because the charge stock can be readily contacted with catalyst and as the catalyst is maintained in the form of a dense phase fluidized bed, a large enough mass of catalyst can be provided in a reaction vessel of feasible size for high conversion of charge stock at a relatively high rate of throughput. Catalyst can be readily circulated from and recirculated to the bed for purposes of regeneration and conditions of reaction severity can be readily controlled by raising or lowering the height of the bed to accommodate variation in feed stock or desired extent of conversion. The mixed state of the fluidized bed, however, results in a homogeneous reaction phase which produces a distribution of products, i.e. yield of gasoline and production of undesired coke and gas for any given conversion level, that is below optimum. Significant improvement in product distribution can be achieved by conducting the conversion reaction under conditions of progressive reaction, that is in a kinetic environment in which all molecules of the reacting constituents are treated equally to increasing reaction time and catalyst contact by flowing powdered catalyst with oil vapor concurrently through an elongated reaction zone at a high enough velocity to prevent forward-backward mixing. In a flow system providing continuity of processing, however, commercial application presents a problem because it is difficult to adjust severity without changing important process variables such as temperature, catalyst-to-oil ratio or flow rates. Moreover, it is difficult to provide sufficient mass of catalyst in the reaction zone to obtain high conversion levels in equipment of feasible size, cost and design. For progressive flow without bumping and excessive vibration requires flow velocities of at least about 12 to 15 feet per second with mass densities of only about 5 to 10 pounds per cubic foot. For example, we have found in flow studies that at a catalyst flow rate of about 60 pounds per square foot per second and a gas velocity of 15 feet per second, a catalyst density of about 6 pounds per cubic foot is obtained. If the velocity is increased to 25 feet per second, the density decreases to about 3 pounds per cubic foot, and at 45 feet per second, the density is only about 1.3 pounds per cubic foot. By contrast, the catalyst density in the dense phase bed of a fluid cracker is about 25-40 pounds per cubic foot. Hence, the length of reactor required for typical commercial conversion levels of 50-70% on fresh feed with typical stocks and catalyst assumes impracticable lengths of 1000 feet or more.

The very nature of the cracking reaction, however, requires that a large molal increase in vapor volume must occur since a heavy molecule is decomposed into two or more lighter molecules. The effect of the molal increase on flow in a system for cracking petroleum hydrocarbons in a tubular reactor is to increase flow velocity proportionately. The increase in flow velocity in the usual 50-70% conversion range is to increase inlet velocities about 2½ to 4 times before outlet. The effect of the increase in velocity is to decrease catalyst densities concomitantly, and aggravate the requirement for an excessively long reaction path, in order to compensate for the fall off in rate of conversion with decrease in catalyst density. According to our invention, the petroleum hydrocarbon charge stock to be converted is mixed with finely divided catalyst to form a suspension having a density of about 5 to 10 pounds per cubic foot and the suspension is flowed at a linear velocity exceeding about 12 to 15 feet per second upward through an elongated vertically extended reaction path wherein the cross-sectional area of the reaction flow path enlarges between the point of inlet and the point of discharge in a manner compensating for molal increase in volume with conversion. For design purposes, a tubular reaction pipe may be employed which is tapered from bottom to top. Most advantageously, the pipe does not have a constant taper but increases in diameter in accordance with the molal increase. The rate of increase varies with different feed stock and conversion conditions, however, and the special fabrication required is expensive so that usually the most practical application of the invention is to employ a tube having a constant taper.

The degree of taper or enlargement of the confined reaction path with flow should be sufficient to account approximately for the molal expansion of a typical stock of the type to be converted under average conversion conditions whereby the reaction suspension may be discharged from the confined path at a flow velocity not substantially exceeding the inlet flow velocity. In this way, we have found that about 3 to 5 times as much catalyst can be carried by a tapered reaction tube compared to a conventional constant diameter tube of the same length. The invention thus provides substantial advantages, for reactors of greatly reduced length may be used for a given severity, or for a given reactor length, much greater reaction severities can be obtained. Moreover, catalysts of lower activity can be utilized more practicably than in a constant diameter reactor.

The invention will be further described by reference to the flow diagram of the accompanying drawing. Preheated oil vapors are charged to the inlet section 10 of reactor tube 11 by means of connection 12. Freshly regenerated catalyst from catalyst standpipe 13 is suspended in the oil vapors in inlet section 10 and the resulting suspension is flowed according to the particular equipment at charge rates providing a density of about 5 to 10 pounds per cubic foot and a flow velocity of at least about 12 to 15 feet per second upwardly through reactor tube 11. The reactor tube 11 is constructed with an enlarging taper over its height so that the molal increase due to the conversion of the charge is accounted for. The effluent from reactor tube 11 is discharged tangentially through pipe bend 14 into catalyst-oil separator 15. Vapors leave separator 15 overhead, advantageously through a system of internal cyclones, by means of line 16 leading to a conventional fractionation system. Catalyst disengaged relatively low) so that only 30% of the total conversion has occurred at 25 feet of tube length. In case 2, 50% of the total conversion has occurred at 25 feet. In case 3, 70% of the total conversion has occurred at 25 feet. The required areas to maintain a velocity of 15 feet per second are provided. Diameters are given to the nearest 0.1 foot for each 10 foot section.

*Table I*

| Length, Ft. | Case 1—30% of Total Conversion at 25 ft. | | | Case 2—50% of Total Conversion at 25 ft. | | | Case 3—70% of Total Conversion at 25 ft. | | |
|---|---|---|---|---|---|---|---|---|---|
| | Area | Diam. | Vol. | Area | Diam. | Vol. | Area | Diam. | Vol. |
| 0 | 11.4 | 3.8 | | 11.4 | 3.8 | | 11.4 | 3.8 | |
| 10 | 14.6 | 4.3 | 130 | 17.8 | 4.7 | 145 | 24.0 | 5.5 | 173 |
| 20 | 17.7 | 4.7 | 161 | 22.7 | 5.3 | 202 | 28.5 | 6.0 | 262 |
| 30 | 20.9 | 5.1 | 193 | 26.5 | 5.8 | 246 | 31.6 | 6.4 | 301 |
| 40 | 23.9 | 5.5 | 224 | 29.6 | 6.1 | 280 | 33.7 | 6.6 | 327 |
| 50 | 26.9 | 5.8 | 254 | 32.1 | 6.4 | 308 | 35.1 | 6.7 | 344 |
| 60 | 29.6 | 6.1 | 282 | 34.0 | 6.6 | 330 | 36.1 | 6.8 | 356 |
| 70 | 32.1 | 6.4 | 308 | 35.6 | 6.8 | 348 | 37.0 | 6.9 | 366 |
| 80 | 34.4 | 6.6 | 333 | 36.8 | 6.9 | 362 | 37.6 | 6.9 | 373 |
| 90 | 36.4 | 6.8 | 354 | 37.6 | 6.9 | 372 | 38.0 | 7.0 | 378 |
| 100 | 38.2 | 7.0 | 373 | 38.2 | 7.0 | 379 | 38.2 | 7.0 | 381 |
| Total volume | | | 2,612 | | | 2,972 | | | 3,261 | in separator 15 settles in the lower section and passes by gravity into catalyst stripper 17 where it may be contacted with steam to strip adsorbed hydrocarbons from the catalyst surface. From stripper 17 catalyst flows into standpipe 18 and from thence into regenerator riser 19. Catalyst entering regenerator riser 19 is picked up by regeneration air introduced by connection 20 and the resulting mixture flows into regenerator 21 where the bulk of the coke is burned-off to regenerate the catalyst for reuse. Flue gas from the regeneration leaves regenerator 21 through a system of internal cyclones 22 and line 23. Dipleg 24 is provided for return of catalyst disengaged in the cyclones to the catalyst bed.

In typical operation, a Midcontinent gas oil is run to 55% conversion in a plant running 26,000 barrels per day of 22° API gravity feed. A reactor tube having a diameter of 4 feet at its entry and a diameter of 7 feet at its outlet is employed in order to accommodate a molal increase over its length of 3 moles of effluent vapors per mole of feed. With an average catalyst density of 4 pounds per cubic foot, a 100-foot reactor tube contains about 11,000 pounds of catalyst. A conventional constant diameter tube of the same length by contrast contains only about 2500 pounds of catalyst. Consequently, more than 4-fold decrease in space velocity, and hence increase in reaction severity or in capacity, is possible in reaction tube 11 compared to the conventional system.

The reaction conditions are adjusted according to the charge stock and the conversion level desired. The reaction temperature is in the range of about 850° to 1000° F.; the catalyst-to-oil ratio is in the range of about 10/1 to 25/1; and the weight hourly space velocity is in the range of about 5 to 60. In application of the invention it may be desirable from the standpoint of fabrication of the reaction tube to fabricate it in convenient lengths of differing diameter, e. g. 10-foot lengths, which are assembled to provide over-all an enlarging diameter. Depending upon the nature of the charge stock and the type and activity of the catalyst, different relationships between length of reaction path and extent of conversion may exist. Tables I and II below provide respectively data for design of reaction tubes for three different cases in a plant processing 26,000 barrels per day of 22° API gravity gas oil at 55 volume percent conversion and the resulting catalyst weight in a 100 foot reaction tube for each case. In the first case, the stock is a relatively refractory stock (or conversely the catalyst activity may be regarded as The following table gives the catalyst weights in a 100 foot long reaction tube for the examples.

*Table II*

| | Volume Ft.³ | Average Density, #/Ft.³ | # Catalyst |
|---|---|---|---|
| (1) Standard Reaction tube—3.8 ft. in diameter. | 1,140 | 2 (due to outlet velocity of 50 ft./sec.). | 2,280 |
| (2) Constant Taper From 3.8 ft. to 7 ft. diameter. | 2,350 | 5 | 11,750 |
| (3) Tapered Reaction tube at 25 ft. 30% of total conversion. | 2,612 | 6 | 15,700 |
| (4) Tapered Reaction tube at 25 ft. 50% of total conversion. | 2,972 | 6 | 17,800 |
| (5) Tapered Reaction tube at 25 ft. 70% of total conversion. | 3,261 | 6 | 19,600 |

It should be noted with respect to Table II that the increase in catalyst weight results in a decrease in space velocity. Hence the conversions for the three cases are not actually equal. To obtain equal conversions, catalyst of lower activity or a shorter tapered riser can be used.

Our invention has its greatest advantage in application to catalytic cracking of heavy petroleum hydrocarbon stocks. Typical stocks are light and heavy gas oils obtained by primary distillation, vacuum distillation or coking from crude oils of various sources and reduced crudes. The boiling range of these stocks may vary over a wide range, e. g. 450° to 650° F. for light gas oils and 650° to 850° F. or even higher for heavy gas oils. The invention, however, may be applicable with advantage to other petroleum hydrocarbon conversions. For example, catalytic reforming operations may be conducted with a finely divided catalyst under conditions of progressive flow reaction. Typical reforming stocks are heavy naphthas, particularly straight run naphthas in the 200° to 450° F. boiling range.

Catalysts for catalytic cracking include known types including silica-alumina or silica-magnesia synthetic microspheres or ground gels and various natural clay type or synthetic gel type catalysts. Catalysts for reforming are, for example, of the platinum-alumina, molybdenum oxide-alumina or chromia-alumina types.

We claim:

1. In the conversion of petroleum hydrocarbons in the presence of a finely divided solid catalyst under flow conditions providing progressive reaction, the method which comprises forming a suspension of the finely divided catalyst in vapors of the petroleum hydrocarbon charge stock to be converted which has a density of about 5 to about 10 pounds per cubic foot and flowing the suspension initially at a linear velocity exceeding about 12 to 15 feet per second upward through an elongated, vertically extending confined reaction path wherein the cross-sectional area of the reaction flow path is enlarged between the point of inlet and a point of discharge by a factor accounting approximately for the molal expansion of a typical stock of the type to be converted under average conversion conditions whereby the reaction suspension is discharged from the confined reaction path at a flow velocity not subtantially exceeding the inlet flow velocity and withdrawing a suspension of said catalyst and reaction products from the upper portion of said reaction path, said withdrawal being the only removal of catalyst from the reaction path.

2. The process of claim 1 wherein the stock to be converted is a typical gas oil cracking charge stock and the catalyst is a cracking catalyst.

3. The process of claim 1 wherein the stock to be converted is a typical heavy naphtha reforming stock and the catalyst is a reforming catalyst.

References Cited in the file of this patent

UNITED STATES PATENTS

| | | |
|---|---|---|
| 2,374,660 | Belchetz | May 1, 1945 |
| 2,379,711 | Hemminger | July 3, 1945 |
| 2,396,109 | Martin | Mar. 5, 1946 |
| 2,397,352 | Hemminger | Mar. 26, 1946 |
| 2,526,689 | Rollman | Oct. 24, 1950 |
| 2,799,095 | May | July 16, 1957 |